United States Patent
Poppe (10) Patent No.: US 11,429,720 B2
(45) Date of Patent: Aug. 30, 2022

(54) METHOD AND SYSTEM FOR FIRMWARE-UPDATING A CONTROL DEVICE FOR PROCESS CONTROL

(71) Applicant: Phoenix Contact GmbH & Co. KG, Blomberg (DE)

(72) Inventor: Joachim Poppe, Bad Münder (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 15/747,058

(22) PCT Filed: Jul. 19, 2016

(86) PCT No.: PCT/EP2016/067214
§ 371 (c)(1),
(2) Date: Jan. 23, 2018

(87) PCT Pub. No.: WO2017/013134
PCT Pub. Date: Jan. 26, 2017

(65) Prior Publication Data
US 2018/0365423 A1 Dec. 20, 2018

(30) Foreign Application Priority Data
Jul. 23, 2015 (DE) .......................... 102015112040.2

(51) Int. Cl.
*G06F 21/12* (2013.01)
*G06F 21/57* (2013.01)
(Continued)

(52) U.S. Cl.
CPC .......... *G06F 21/572* (2013.01); *G05B 19/00* (2013.01); *G05B 19/0426* (2013.01); *G06F 8/65* (2013.01);
(Continued)

(58) Field of Classification Search
CPC .......... G06F 21/572; G06F 2221/2139; G06F 2221/0773; G06F 21/105; G05B 19/00; G05B 19/0426
See application file for complete search history.

(56) References Cited

U.S. PATENT DOCUMENTS 7,233,830 B1 * 6/2007 Callaghan .......... G05B 19/4188
700/9
7,286,886 B2  10/2007 Klopfer et al.
(Continued)

FOREIGN PATENT DOCUMENTS

DE         10350993        5/2005
DE      102010016257 A1   10/2011
(Continued)

OTHER PUBLICATIONS

"Office Action", issued in counterpart German Patent Application No. 102015112040.2, dated Jun. 6, 2016, 15 pp.
(Continued)

*Primary Examiner* — Lewis A Bullock, Jr.
*Assistant Examiner* — Mohammad H Kabir
(74) *Attorney, Agent, or Firm* — Kaplan Breyer Schwarz, LLP (57) ABSTRACT

For simplifying and/or improving the updating of firmware of a control device, in particular of a safety controller, the invention provides a method and a system for updating firmware, in which a device-specific authorization check for performing a firmware update is performed by the manufacturer, and in case of a successful authorization check a device-specific activation code for performing the firmware update is provided, and for this purpose an enabling device is provided on the manufacturer's side and an updating device connectable to a control device on the user's side. The improvement is that the safe and secure firmware update proceeds under the control and long-term archiving of the manufacturer.

(Continued)

The invention furthermore relates to a digital storage medium having instructions stored thereon for use when performing the method according to the invention.

12 Claims, 3 Drawing Sheets

(51) Int. Cl.
    *G06F 21/10* (2013.01)
    *G05B 19/042* (2006.01)
    *G05B 19/00* (2006.01)
    *G06F 8/65* (2018.01)

(52) U.S. Cl.
    CPC .... *G06F 21/105* (2013.01); *G06F 2221/0704* (2013.01); *G06F 2221/0773* (2013.01); *G06F 2221/2139* (2013.01)

(56) References Cited

U.S. PATENT DOCUMENTS

| | | | |
|---|---|---|---|
| 7,929,692 B2 | 4/2011 | Kim et al. | |
| 8,307,356 B2 | 11/2012 | Klopfer et al. | |
| 8,601,170 B1* | 12/2013 | Marr | G06F 21/572 710/15 |
| 8,997,249 B1 | 3/2015 | Bushman et al. | |
| 2004/0107356 A1* | 6/2004 | Shamoon | H04L 63/0428 713/193 |
| 2006/0130046 A1* | 6/2006 | O'Neill | G06F 8/654 717/168 |
| 2007/0169073 A1* | 7/2007 | O'Neill | G06F 8/61 717/168 |
| 2008/0052698 A1 | 2/2008 | Olson et al. | |
| 2008/0148249 A1 | 6/2008 | Komiya et al. | |
| 2008/0250403 A1 | 10/2008 | Moon et al. | |
| 2008/0295087 A1 | 11/2008 | Kang et al. | |
| 2012/0272226 A1 | 10/2012 | Yang et al. | |
| 2014/0283133 A1* | 9/2014 | Rodriguez | G06F 21/121 726/29 |
| 2015/0121071 A1 | 4/2015 | Schwarz et al. | |
| 2015/0127930 A1* | 5/2015 | Offenberg | G06F 21/572 713/2 |
| 2015/0261966 A1* | 9/2015 | Mensch | G06F 21/602 713/189 |

FOREIGN PATENT DOCUMENTS

| | | |
|---|---|---|
| DE | 102012220767 A1 | 5/2014 |
| EP | 0790554 A1 | 8/1997 |
| EP | 1525518 A1 | 4/2005 |
| EP | 1532494 B1 | 5/2005 |
| JP | 2004-157753 | 6/2004 |
| WO | 2012/067989 A1 | 5/2012 |

OTHER PUBLICATIONS

"Office Action" issued in counterpart German Patent Application No. 102015112040.2, dated Jun. 6, 2016.
Authorized Officer: Pozzi, Sandra, "International Search Report and Written Opinion" issued in counterpart PCT Application No. PCT/EP2016/067214, dated Jan. 26, 2017.

* cited by examiner

METHOD AND SYSTEM FOR FIRMWARE-UPDATING A CONTROL DEVICE FOR PROCESS CONTROL

FIELD

The invention generally relates to automation technology, and more particularly to a method and a system for updating firmware of a control device for process control.

BACKGROUND

In automation technology, control devices are used to control machines and systems, wherein the control devices are connected to the respective machine or system via sensors and actuators, which sensors and actuators are usually connected to inputs and outputs of the control device via I/O modules. Nowadays, the control devices are usually implemented as programmable logic controllers (PLC) which can be programmed with a control application that can be executed by a microprocessor of the control device.

In particular for controlling safety-relevant processes, i.e. operations that pose a danger to human beings or machines, safety controllers are employed, which must meet predefined safety requirements. For fault correction or for expansion of the functionality of a safety controller, it may be necessary to update the firmware in the form of an update. The firmware typically comprises an operating software for the control device and also software for loading the operating software, also referred to as a loader, and may furthermore comprise an operating program for a programmable IC, such as for example a field programmable gate array (FPGA), which is the microprocessor for executing the control application.

However, in order to meet the safety requirements imposed on a safety controller, such a firmware update cannot be readily performed by a user. A firmware update can be performed by the device manufacturer in compliance with the safety requirements, which however is associated with high logistical complexity and high costs, in particular if control devices are already installed in the field.

From EP 1 532 494 B1, a method is known for loading a new operating program onto a safety controller, wherein the safety controller includes an integrated download and enabling device for loading a new operating program, and wherein the integrated enabling device allows or inhibits the loading of the new operating program as a function of enabling information.

SUMMARY

It is an object of the present invention to provide a way for simplifying and/or improving a method for updating firmware of a control device, in particular of a safety control device.

A key idea of the invention is to perform a device-specific authorization check for execution of a firmware update on a manufacturer's side and if the authorization check is successful, to provide a device-specific activating code for performing the firmware update, and for this purpose an enabling or activating device is provided on the manufacturer's side and an updating device connectable to a control device is provided on the user's side.

In this way, firmware updates can advantageously be performed under complete control of the manufacturer, while logistical complexity and costs required for this purpose can be considerably reduced, and moreover trackability of performed firmware updates is made possible individually for each device. In particular, a safe and secure firmware update is made possible under control and with long-term archiving by the manufacturer.

The above-mentioned technical object is solved on the one hand by the features of a disclosed embodiment.

Accordingly, a method is provided for updating firmware of a control device for process control which comprises at least one control module, wherein the control module has associated therewith a firmware stored in a system memory of the control device. According to the method, first a firmware file with a new firmware contained therein for the at least one control module is provided in an updating device that is connectable to the control device. This can be accomplished in any suitable manner, for example by loading from a data medium, or by downloading from the Internet from a website of the control device manufacturer. The control device is in particular configured as a safety controller for fail-safe control of a safety-critical process.

The method further comprises that the updating device retrieves first device data from the control device, said first device data being stored in the control device, generates a signed device file depending on these first device data and depending on information identifying the new firmware, and transmits the signed device file to a central enabling or central activating device. This may be effected, for example, in response to a user input entered at the updating device, and the firmware to be newly installed may optionally also be selected by the user input. For generating the signed device file, it is in particular possible to generate, in a manner known per se, a digital signature using a secret signature key, which digital signature allows the central enabling device to verify the integrity of the signed device file using an associated verification key. In the simplest case, the signed device file comprises the first device data and the information identifying the new firmware, as well as a digital signature generated for these data.

The central enabling device checks the received signed device file, and only if the check is successful an activation code is generated and returned to the updating device, the activation code comprising second device data and a unique identification information item. The unique identification information item can advantageously be provided as a Globally Unique Identifier (GUID) and is used to track firmware updates that have been performed.

Upon receipt of the activation code, the updating device performs a consistency check on the first device data depending on which the signed device file was generated, and on the second device data contained in the received activation code. Alternatively, the method may comprise that the updating device again retrieves the first device data stored in the control device, in which case the updating device performs a consistency check on the again retrieved first device data and on the second device data contained in the received activation code.

The communication between the updating device and the central enabling device can preferably be effected via a direct communication link, for example a wired Internet connection. However, transfer of the data between the updating device and the central enabling device may also be effected in any other suitable manner, for example by e-mail data exchange, or via a wireless network. Data exchange using a separate data carrier would in principle be conceivable as well.

Repeated retrieving of the first device data may advantageously be provided for in particular if the data exchange takes place offline, i.e. not via an established communication connection, since in this case the first device data might have changed since the previous retrieving.

Only if the consistency check is successful, the updating device performs an update of the firmware of the control device using the new firmware. For executing the firmware update of the control device, the method advantageously comprises that the updating device first transfers the new firmware to the control device in the form of a firmware file, and then transmits a device-specific update command to the control device for initiating the update, and in response to the received update command the control device automatically updates the firmware of the control module stored in the system memory with the firmware contained in the received firmware file, preferably by overwriting the firmware stored in the system memory with the new firmware. The firmware file transferred by the updating device may initially be buffered for this purpose, wherein buffering may for example be done in a parameterization memory of the control device. The system memory and/or the parameterization memory is preferably implemented as a rewritable memory, such as a flash memory or an EEPROM.

By using a device-specific update command, additional clone protection is advantageously achieved, i.e. the update process is not freely transferable to any other control devices without being logged at the manufacturer's side.

Advantageously, the firmware file further comprises protection information, and the control device performs a consistency check on the protection information and allows the firmware update to continue only if the consistency check is successful. The protection information may in particular comprise a check value, for example in the form of a Cyclic Redundancy Check (CRC) value, which can be used to detect errors that have occurred during storage or transmission of the firmware file.

In an advantageous embodiment, the control device may comprise a plurality of control modules, i.e. at least two. Advantageously, a separate firmware may be provided for each of the control modules. Accordingly, the firmware file may comprise new firmware for each of the at least two control modules. It may also be provided for updating the firmware of the at least two control modules separately, wherein in this case the firmware file includes only a single new firmware for one of the at least two control modules.

With particular advantage, the unique identification information item contained in the activation code is transmitted from the updating device to the control device and is stored in the control device. This advantageously provides for trackability of performed firmware updates on the control device.

Particularly advantageously, the central enabling device performs an update authorization check, in particular by retrieving authorization information from a product life cycle management database on the basis of device-specific information contained in the received signed device file.

For this purpose, significant stored data or features are retrieved from the product life cycle management database and checked against the received signed device file, taking into account device-specific features such as device type, hardware production status, and/or the current firmware version.

In order to be able to perform the check for update authorization by the central enabling device and in order to be able to perform the consistency check on the first and second device data by the updating device, the first and/or second device data preferably comprise a device type, a hardware version, and/or a serial number of the control device, and/or information about at least one firmware currently executed by the control device.

The consistency check on the first and second device data in particular comprises a comparison of respective contained data, in particular of a device-specific information such as the serial number, in order to check whether the received activation code has been generated for the control device for which a firmware update is to be performed.

In order to allow for full trackability on the manufacturer's side of successfully performed firmware updates, it is particularly advantageously provided for the updating device to transmit an acknowledgment message to the central enabling device once the firmware update has been successfully completed, wherein the central enabling device in response to the received acknowledgment message logs the successful completion of the firmware update, in particular by storing a log entry containing the unique identification information item in the product life cycle management database. Advantageously, it is also possible to create a history of the performed firmware updates, for verification in the sense of a required life cycle management.

In order to apply the firmware update, a system reboot of the control device has to be performed. Accordingly, the transmitting of the acknowledgment message from the updating device to the central enabling device is effected after the rebooting has been performed.

Upon rebooting of the control device, a self-test of the control device is preferably carried out. Such a self-test is also known as a Power-On Self-Test (POST). The steps typically performed in a POST are known per se and will therefore not be detailed here.

If the control device comprises a plurality of control modules, it is advantageously provided for the control device to perform a check for compatibility of the firmware associated with the different control modules, once the firmware of the at least one control module stored in the system memory has been updated, and if any incompatibility is detected, the control device changes into a safe operating state. This check can be provided as part of the POST, wherein the control device will also change into a safe operating state upon detection of some other error or some other incompatibility.

To increase safety and security, the method may advantageously provide for failsafe and/or encrypted data transfer. This concerns the transmitting of the signed device file from the updating device to the central enabling device, the transmitting of the activation code from the central enabling device to the updating device, the transmitting of the device-specific updating command from the updating device to the control device, and/or the transmitting of the unique identification information item included in the activation code from the updating device to the control device.

The aforementioned technical object is also solved by a system based on features of a disclosed embodiment.

Accordingly, an inventive system for updating firmware of a control device comprises a control device for process control comprising at least one control module, wherein the control module has associated therewith a firmware stored in a system memory of the control device, an updating device connectable to the control device, and a central enabling device, wherein the updating device is adapted to retrieve, from the control device, first device data stored in the control device, to generate a signed device file depending on the first device data and depending on an information item identifying a new firmware, to transmit the signed device file to the central enabling device, to receive an activation code from the central enabling device in response to the transmitted signed device file, to perform a consistency check on the first device data depending on which the signed device file was generated, and on second device data contained in the received activation code, or to again retrieve the first device data stored in the control device from the control device and to perform a consistency check on the again retrieved first device data and on second device data contained in the received activation code, and if the consistency check is successful, to effect update of the firmware of the control device using the new firmware, and wherein the enabling device is adapted to check a signed device file received from the updating device, to generate an activation code if the check is successful, which activation code comprises second device data and a unique identification information item, and to transmit the activation code to the updating device in response to the received signed device file.

An essential aspect of the invention can be seen in the fact that it allows for corresponding trackability of performed firmware updates both on the manufacturer's side and on the respective control device.

For this purpose, the control device is advantageously adapted to store the unique identification information item contained in the activation code received from the updating device. Furthermore, the updating device is advantageously adapted to transmit an acknowledgment message to the central enabling device when the firmware updating has been performed successfully, and the central enabling device is advantageously adapted to log successful completion of the firmware update in response to the received acknowledgment message, in particular by storing a log entry containing the unique identification information item in a product life cycle management database.

The functionality of the updating device is preferably in the responsibility of the device manufacturer. Particularly advantageously, the device manufacturer may provide a software which in the following will also be referred to as a download tool, which can be installed by the user on a conventional computer that has a communication interface for communicating with a control device, so as to form the updating device.

The aforementioned technical object is also solved by a digital storage medium based on features of a disclosed embodiment.

Accordingly, a digital storage medium is provided with instructions stored thereon, which when executed on a computer are adapted to perform the method steps of: a) retrieving first device data stored in a control device connected to the computer; b) generating a signed device file depending on the first device data and depending on information identifying a newly provided firmware; c) transmitting the signed device file to a central enabling device; d) receiving an activation code from the central enabling device in response to the transmitted signed device file, the activation code comprising second device data and a unique identification information item; e) performing a consistency check on the first device data retrieved in step a) and on the second device data contained in the received activation code, or again retrieving the first device data stored in the control device and performing a consistency check on the again retrieved first device data and on the second device data contained in the received activation code; and f) only if the consistency check is successful, effecting update of the firmware of the control device using the new firmware.

BRIEF DESCRIPTION OF THE DRAWINGS

The invention will now be described in more detail by way of exemplary preferred embodiments and with reference to the accompanying drawings. Therein, same reference numerals in the drawings designate the same or similar components. It is shown in.

DETAILED DESCRIPTION

Figure 1:
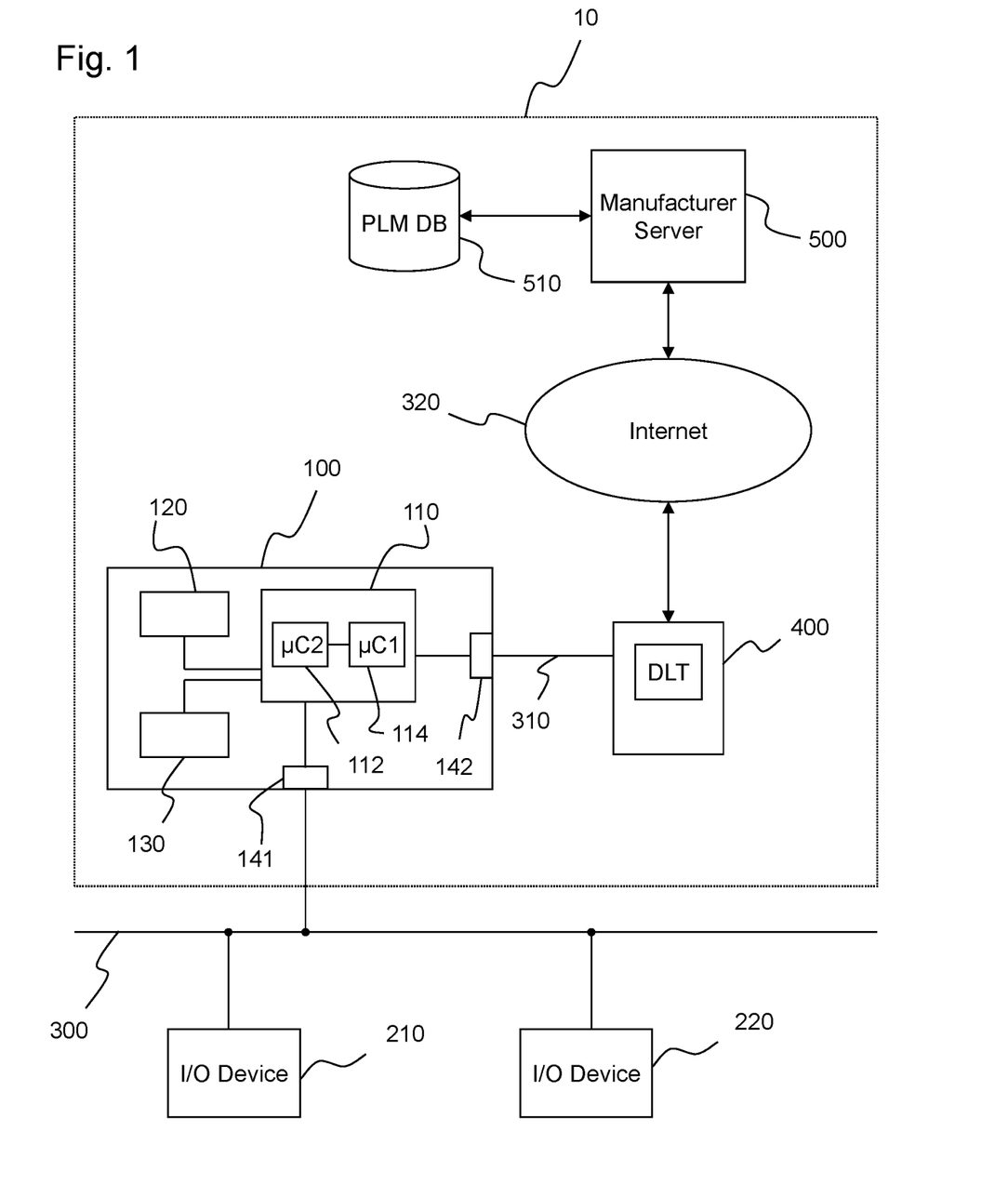
FIG. 1 a schematic view of a preferred embodiment of a system for updating firmware.

FIG. 1 shows an exemplary system 10 for updating the firmware of a control device 100 that is configured as a safety control device and which is for example employed in automation technology. In the illustrated exemplary embodiment, control device 100 is connected via an interface 141 to a communication network 300, and via this network to process devices 210 and 220. Communication network 300 may be configured as a PROFINET communication network, for example. PROFINET (Process Field Network) is an open Industrial Ethernet standard used in automation. However, any other suitable communication network may be used as well, such as a fieldbus.

In the illustrated exemplary embodiment, control device 100 comprises a control unit 110 including two control modules, 112 and 114. Furthermore, control device 100 comprises an internal system memory 120 connected to the control unit 110, which however cannot be accessed from outside. Here, the firmware is stored, for example in the form of a composite file, known as a container file, which is unpacked and put into operation at system startup. Furthermore, a parameterization memory 130 is provided in the control device 100, which contains the configuration of the control device, the application program, and optionally further application-specific data. A firmware update can for instance be performed by having a new firmware container stored in the parameterization memory via communication interface 142 of control device 100, and then having a command to the control device 100 starting a procedure that puts into operation the new firmware with this container.

In the illustrated exemplary embodiment, for this purpose control device 100 is connectable to a computer 400, via a communication connection 310, which computer has a software tool installed thereon, which is provided by the manufacturer of control device 100 and will in the following be referred to as a download tool, and which in FIG. 1 is designated as DLT, for short.

Interface 142 may be a USB interface, for example, or an Ethernet interface.

Computer 400 is preferably connected to a manufacturer server 500 via the Internet 320, wherein the manufacturer server 500 comprises a central enabling device. Data transfer between the download tool and the central enabling device may also be effected via other means, instead of via the Internet. In the illustrated exemplary embodiment, the manufacturer server 500 is further connected to a product life cycle management database 510, hereinafter also referred to as PLM DB, for short.

In the following, a preferred procedure of a firmware update will be outlined.

The download tool retrieves device data including the type, the serial number, and information on the current hardware and firmware status, from the safety control device 100.

The download tool adds the version of the firmware to be updated, provides protection against corruption and manipulation, and stores the whole as a device signature file.

The device signature file is transmitted to the manufacturer server 500, via e-mail or advantageously via direct Internet communication.

At the manufacturer's side the authorization for the update is checked, which is advantageously executed by a server service running on the manufacturer server 500 and configured as an authorization generator.

For checking the authorization, the PLM DB 510 is queried at the manufacturer's side, and consistency and plausibility of the transferred data is checked, and the hardware version contained in PLM DB 510 is checked for an update authorization.

If update authorization is given, a secure device-specific activation code is generated in the form of a file which contains a unique code that is used for trackability.

The activation code comprises information about the device type, serial number, hardware version, and a code for trackability.

The activation code is protected against corruption and manipulation and is transmitted to the user of the download tool, via e-mail or preferably via direct Internet communication.

The download tool imports the firmware update file in the form of a secure firmware container with device identifier and version identifier included, and also the activation code generated by the manufacturer.

The download tool checks for consistency of the data from the control device 100 and the data included in the activation code, and enables or blocks download of the secure firmware container to the control device 100.

Once the transfer of the firmware update file to the control device 100 and a consistency check on the control device 100 has been completed, the programming including a countercheck is executed on the control device 100.

A secure programming command is used to initiate the programming.

If the transfer of the firmware container or the programming thereof did not proceed correctly, the user is notified and the device remains in an intrinsically safe state.

In this state, repetition of the programming is necessary and possible.

The user of the control device receives a firmware update file that is transmitted to him, or alternatively he can download it from the manufacturer via the Internet; this means that the firmware update file is not personalized.

The firmware update file is a secure container file that is generated by the manufacturer and additionally protected against data corruption or data manipulation by a header data set, referred to as header, for short.

The firmware update file contains firmware components for both control modules of the safety control device 100 and optionally further components, advantageously for example FPGA configuration and firmware loader which have jointly undergone an approval process according to IEC 61508 and are certified.

The user starts the download tool, reads the firmware update file and connects to the control device 100.

The download tool generates a signature file from the data of control device 100 and from the firmware update file, which signature file includes update-relevant data such as serial number, hardware version, current firmware version, and new firmware version.

The signature file is transmitted to the manufacturer, for example via e-mail or via direct Internet communication.

After checking the update possibility, the manufacturer generates an activation code in the form of a secure file and transmits it to the user, for example via e-mail or advantageously via direct Internet communication.

The user reads the activation code together with the firmware update file into the download tool, and the download tool checks the consistency of the activation code.

If the check is positive, the firmware update file is transferred to the connected control device 100, as a secure container, and is checked there for consistency of the container, wherein in particular the header is checked.

Thereafter, programming into the system memory 120 and another readback is performed.

The result of the transfer, the programming, and the checks are displayed to the user by the download tool, and an update log is generated.

Once the programming has been completed, the device has to be rebooted.

When the programmed firmware is started, a further consistency check is performed, during which the firmware loader checks the checksum of the firmware to be loaded.

After starting the two diversitary firmware components, a check is made as to whether the firmware versions are compatible with each other.

Figure 2:
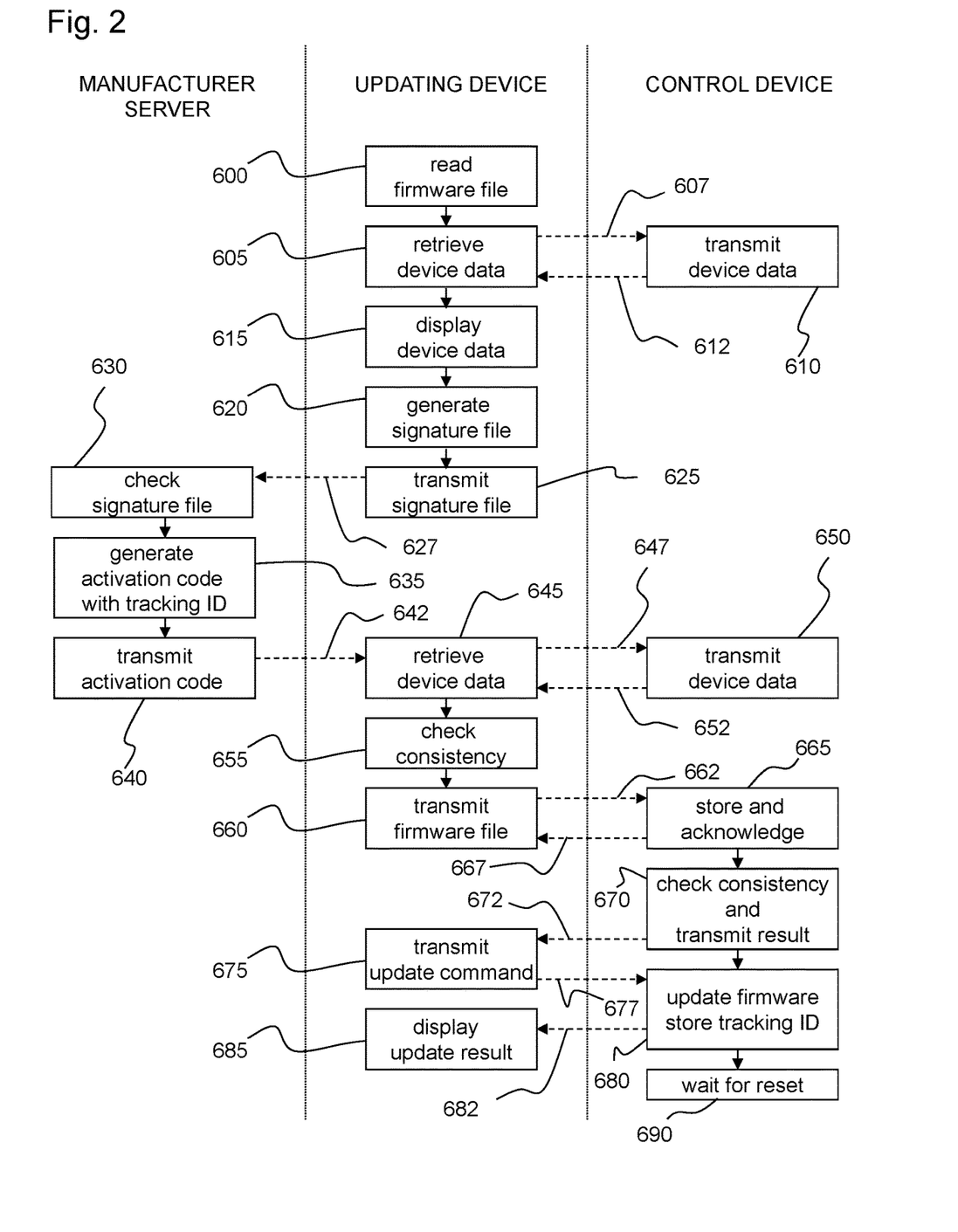
FIG. 2 a schematic flow chart of a first phase of a firmware update.
Figure 3:
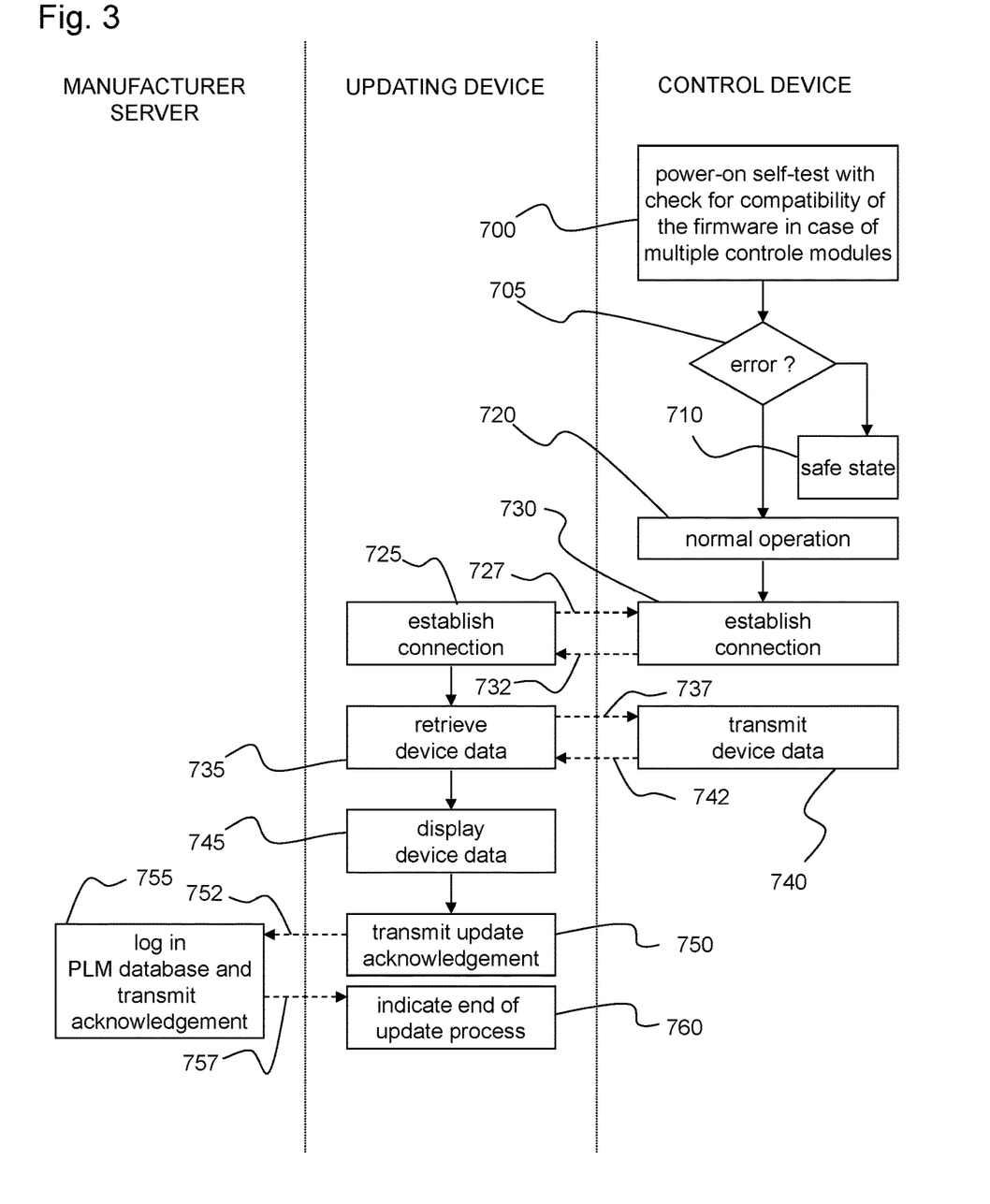
FIG. 3 a schematic flow chart of a second phase of a firmware update.

A preferred sequence of a firmware update is again illustrated in detail in FIGS. 2 and 3 as a flow chart, FIG. 2 showing a first phase, and FIG. 3 showing a second phase.

Phase 1 as illustrated in FIG. 2 comprises the following steps:

In step 600, the firmware file is red by the download tool on the updating device 400 from the local file system. In step 605, the control device 100 is identified by a data retrieval, for which purpose the updating device 400 transmits a corresponding request 607 to the control device 100 which in response to this request, in step 610, causes first device data to be sent, which are transmitted to the updating device 400 in step 612. In the illustrated exemplary embodiment it is provided for the device data received from control device 100 to be displayed to the user in step 615. The device data secured with the header data of the firmware update file are transmitted to the manufacturer, wherein for this purpose a respective signature file is generated in step 620 and transmitted to the manufacturer server 500 in step 625. The signature file transmitted to the manufacturer server 500 in step 627 is checked in step 630 by an enabling device included in the manufacturer server 500. For checking authorization, the manufacturer server 500 performs a comparison with the PLM DB 510. If the authorization check is successful, the manufacturer server 500 in step 635 generates a secure activation code, for example in the form of an activation file which includes a protection and a unique code as a tracking ID. In step 640, the manufacturer server 500 transmits the activation code to the updating device 400. The activation code transmitted in step 642 is received by the updating device 400, and in response to the receipt of the activation code transmitted in step 642 in the illustrated exemplary embodiment the updating device 400 in step 645 again retrieves the first device data from the control device 100, wherein for this purpose the updating device 400 transmits a corresponding request 647 to the control device 100 which in response to this request, in step 650, causes first device data to be sent, which are transmitted to the updating device 400 in step 652. The download tool executed on the updating device 400 in step 655 checks the consistency of device and activation code, and if the consistency check is successful, causes data transfer in step 660. For this purpose, the firmware update file is transferred to the control device 100, in step 662, and is initially buffered there, in step 665. For the buffering, parameterization memory 130 can be used, or another suitable memory, which may also be a volatile memory. In step 667, an acknowledgement about the buffering is transmitted to updating device 400. In step 670, a consistency check for formal correctness is performed on the firmware update file, wherein the result of the check is transmitted to the updating device 400 in step 672. If the consistency check was successful, the updating device 400 then transmits a device-specific update command to the control device 100, in step 675, wherein preferably the result of the consistency check is displayed to the user, and the user additionally confirms by an input the execution of the update, i.e. the programming or overwriting of the system memory 120 with the new firmware. In response to the receipt of the update command transmitted in step 677, the control device 100 in step 680 executes the firmware update, and stores the unique tracking ID. In step 682, the control device 100 transmits the information as to whether the update, i.e. the overwriting of the system memory, has been performed successfully to the updating device 400, wherein in step 685 the update result is displayed to the user. Upon completion of the firmware update, the control device 100 enters a wait state for reset, in step 690, i.e. waits for rebooting of the control device 100, wherein it may also be provided for an automatic execution of rebooting.

Phase 2 illustrated in FIG. 3 comprises the following steps:

After rebooting of the control device 100, the latter first performs a self-test, in step 700, wherein it is in particular checked for package compatibility of the firmware respectively associated with control modules 112 and 114, which may be provided as diversitary firmware components.

If in step 705 an error is detected while performing the self-test, the control device 100 enters a safe state in step 710. The measures required to achieve a safe state are known per se and are therefore not explained in detail here.

If no error is detected, control device 100 starts normal operation, in step 720. In step 725, the download tool in updating device 400 establishes a connection to control device 100, wherein for this purpose preferably cyclically repeated connection requests 727 are transmitted to control device 100, until the control device 100 responds in step 730 and answers to the connection request 727, in step 732.

In step 735, the download tool retrieves the updated device data, wherein for this purpose the updating device 400 transmits a corresponding request 737 to control device 100 which in response to this request, in step 740, causes device data to be sent to the updating device 400, in step 742. In step 745, the download tool displays the retrieved device data to the user, possibly with an error message. In step 750, an acknowledgement of the update is transmitted to the manufacturer server 500, in secured manner. In response to the update acknowledgment transmitted in step 752, the manufacturer server 500 logs or stores the acknowledgment in PLM DB 510, in step 755. An acknowledgment of completed logging is transmitted to the updating device 400, in step 757, and in step 760 the user is informed about the end of the process by a respective indication.

The following table illustrates an exemplary structure of a firmware update file, i.e. of the secure firmware container:

| Component | Content | Description |
| --- | --- | --- |
| Container header | 1. Filename of the container, i.e. of the firmware update file | Name of the firmware update file, the file is thus protected against renaming (item 1 is part of item 6); |
| | 2. Device ID | Unique numeric device identifier; |
| | 3. Version number | Version of the firmware update file; |
| | 4. Number of included components | Number of subsequent components, for example in case of more than one and possibly also diversitary control modules |
| | 5. Component header 1: | |
| | a) Destination (e.g., Control Module 1 or Control Module 2) | Ensuring the correct destination of programming and |
| | b) Type of image (loader, operating software, or FPGA program) | verification of the contained image; |
| | c) Offset address in the firmware update file | Determining the position in the firmware update file |
| | d) Size in the firmware update file | Size incl. image header; |
| | e) Destination address | Destination address in read-only memory; |
| | f) Checksum over the complete component (including header) | Protection against corruption of the header or the component |
| | 6. Component headers 2 . . . n | Additional component headers according to the number in item 4 |
| | 7. Header checksum over items 1 to 4 and all component headers | Checksum over items 1-6 (all component headers) |
| Firmware image 1 | 1. Image header (magic number 1, checksum, size, address information) | Information for the firmware loader |
| | 2. Firmware image 1 | Firmware image 1 to be loaded |
| Firmware image . . . | 1. Image header . . . | Information for the firmware loader |
| | 2. Firmware image . . . | Further firmware images . . . to be loaded |
| Firmware image n | 1. Image header n | Information for the firmware loader |
| | 2. Firmware image n | Firmware image n to be loaded |

It should be noted that in the example shown in the table the firmware to be updated, also referred to as a firmware image, may comprise an operating software, a software used to load an operating software and known as a loader, as also an FPGA program used for programming a processor implemented as a Field Programmable Gate Array (FPGA).

The described method advantageously provides a distributed comparison and enabling device externally to the safety control device. Thus, a protected approval principle is implemented, wherein approval or comparison and responsibility firstly lies on the manufacturer's side, and to enable programming rests with the download tool or ultimately with the user. The download tool itself is in the responsibility of the manufacturer. Encryption of the firmware update file is advantageous, but not mandatory per se, since all steps are preferably protected by a confidential checksum procedure. Particularly advantageously, by implementing the important comparison and enabling steps outside of the firmware, the employed algorithm can easily be adapted, when needed, without having to change the firmware. The procedure can in principle be interrupted after the first retrieval of the device data, but advantageously runs online consecutively. Programming requires the agreement of the user and is initiated by a secure programming command. The unique code, which is part of the activation and was generated at the manufacturer's side, is stored in the PLM database 510 and in non-volatile manner on the control device 100, and preferably it is part of the programming command. This code permits to track through which activation the firmware update was effected, wherein the code is stored at the manufacturer's side and in the device, so that a double chain of proof is achieved. The unique code is advantageously realized by means of a Globally Unique Identifier (GUID). Furthermore, possible aborts of communication are monitored by timeouts and are also logged at the manufacturer's side, wherein advantageously canceled updates are matched between the PLM DB 510 and the user, wherein the information necessary for this purpose is available.

The invention claimed is:

1. A method for updating firmware of a programmable logic controller for process control, the method comprising the steps of:
    a) providing a firmware file in a computer that is connectable to the programmable logic controller, the programmable logic controller comprising at least two control modules integrated within the programmable logic controller, each of the at least two control modules having associated therewith a separate firmware stored in a system memory of the programmable logic controller, and wherein the firmware file comprises new firmware for each of the at least two control modules or a single new firmware for one of the at least two control modules;
    b) retrieving, by the computer, a first set of device data stored in the programmable logic controller;
    c) generating, by the computer, a signed device file containing said first set of device data and an information item identifying the new firmware;
    d) transmitting, by the computer, the signed device file to a server;
    e) checking, by the server, the consistency and plausibility of the first set of device data and the information item identifying the new firmware contained in the received signed device file;
    f) if the server determines that the first set of device data and the information item identifying the new firmware contained in the received signed device file is consistent and plausible, generating, by the server, an activation code comprising a second set of device data and a Globally Unique Identifier;
    g) transmitting, by the server, the activation code to the computer;
    h) checking, by the computer, the consistency of: 1) the first set of device data retrieved in step b); and 2) the second set of device data contained in the received activation code; or
    again retrieving, by the computer, the first set of device data stored in the programmable logic controller and checking, by the computer, the consistency of: 1) the again retrieved first set of device data; and 2) the second set of device data contained in the received activation code;
    i) if the consistency check of step h) is successful, performing, by the computer, an update of the firmware of the programmable logic controller using the new firmware; and
    j) transmitting, by the computer, the Globally Unique Identifier contained in the activation code to the programmable logic controller, wherein the Globally Unique identifier is stored in the programmable logic controller.

2. The method as claimed in claim 1, wherein the performing of an update of the firmware of the programmable logic controller comprises the steps of:
    transferring the new firmware from the computer to the programmable logic controller in the form of a firmware file;
    transmitting a device-specific update command from the computer to the programmable logic controller; and
    in response to the received update command, updating the firmware of the at least two control modules stored in the system memory with the firmware contained in the received firmware file.

3. The method as claimed in claim 1, wherein the firmware file comprises protection information, and wherein the programmable logic controller performs a consistency check on the protection information and only allows the firmware update to continue if the consistency check is successful.

4. The method as claimed in claim 1, wherein the first set of device data and the second set of device data include a device type, a hardware version, or a serial number of the programmable logic controller, and/or information about at least one firmware currently executed on the programmable logic controller.

5. The method as claimed in claim 1, wherein an update authorization check is performed by the server, by retrieving authorization information from a product life cycle management database on the basis of device-specific information contained in the received signed device file.

6. The method as claimed in claim 1, wherein, once the firmware update has been successfully performed, the computer transmits an acknowledgment message to the server, wherein in response to the received acknowledgment message the server logs successful completion of the firmware update, in particular by storing a log entry containing the Globally Unique Identifier in the product life cycle management database.

7. The method as claimed in claim 1, wherein, once the firmware of the at least two control modules stored in the system memory has been updated, the programmable logic controller performs a check for compatibility of the firmware associated with different control modules, and if an incompatibility is detected, the programmable logic controller changes into a safe operating state.

8. The method as claimed in claim 1, wherein the programmable logic controller is configured as a safety programmable logic controller for failsafe control of a safety-critical process.

9. The method as claimed in claim 1, wherein:
the transmitting of the signed device file from the computer to the server, or
the transmitting of the activation code from the server to the computer, or
the transmitting of the device-specific updating command from the computer to the programmable logic controller, or
the transmitting of the Globally Unique Identifier contained in the activation code from the computer to the programmable logic controller is performed in failsafe and/or encrypted manner.

10. A system for updating firmware of a programmable logic controller, comprising:
a programmable logic controller for process control comprising at least two control modules integrated within the programmable logic controller, wherein each of the at least two control modules has associated therewith a separate firmware stored in a system memory of the programmable logic controller;
a computer connectable to the programmable logic controller, the computer having a firmware file, wherein the firmware file comprises new firmware for each of the at least two control modules or a single new firmware for one of the at least two control modules; and
a server;
wherein the computer retrieves a first set of device data stored in the programmable logic controller;
wherein the computer generates a signed device file containing the first set of device data and the information item identifying the new firmware;
wherein the computer transmits the signed device file to the server;
wherein the server checks the consistency and plausibility of the first set of device data and the information item identifying the new firmware contained in the received signed device file;
wherein if the server determines that the first set of device data and the information item Identifying the new firmware contained in the received signed device file is consistent and plausible, the server generates an activation code comprising a second set of device data and a Globally Unique Identifier;
wherein the server transmits the activation code to the computer;
wherein the computer checks the consistency of: 1) the first set of device data retrieved from the programmable logic controller; and 2) the second set of device data contained in the received activation code; or the computer again retrieves the first set of device data stored in the programmable logic controller and checks the consistency of: 1) the again retrieved first set of device data and 2) the second set of device data contained in the received activation code;
wherein if the consistency check is successful, the computer performs an update of the firmware of the programmable logic controller using the new firmware; and
wherein the computer transmits Globally Unique Identifier contained in the activation code to the programmable logic controller, wherein the Globally Unique Identifier is stored in the programmable logic controller.

11. The system as claimed in claim 10, wherein:
the programmable logic controller is adapted to store the Globally Unique Identifier contained in the activation code received from the computer;
the computer is adapted to transmit an acknowledgment message to the server when the firmware updating has been performed successfully; and
the server is adapted, in response to the received acknowledgment message, to log successful completion of the firmware update, in particular by storing a log entry containing the Globally Unique Identifier in the product life cycle management database.

12. A non-transitory computer-readable storage media storing instructions, which when executed on a system comprising a server and a computer having a firmware file contained therein, wherein the firmware file comprises new firmware, cause the system to perform operations comprising the steps of:
a) retrieving, by the computer, a first set of device data stored in the programmable logic controller connectable to the computer;
b) generating, by the computer, a signed device file containing the first set of device data and an information item identifying the new firmware, the new firmware for at least one of at least two control modules integrated within the programmable logic controller;
c) transmitting, by the computer, the signed device file to the server;
d) checking, by the server, the consistency and plausibility of the first set of device data and the information item identifying the new firmware contained in the received signed device file;
e) if the server determines that the first set of device data and the information item identifying the new firmware contained in the received signed device file is consistent and plausible, generating, by the server, an activation code comprising a second set of device data and a Globally Unique Identifier;
f) transmitting, by the server, the activation code to the computer;
g) checking, by the computer, the consistency of: 1) the first set of device data retrieved in step a), and 2) the second set of device data contained in the received activation code, or again retrieving, by the computer, the first set of device data stored in the programmable logic controller and checking, by the computer, the consistency of: 1) the again retrieved first set of device data; and 2) the second set of device data contained in the received activation code;
h) if the consistency check in step g) is successful, performing, by the computer, an update of the firmware of the programmable logic controller using the new firmware; and
i) transmitting, by the computer, the Globally Unique Identifier contained in the activation code to the programmable logic controller for storage therein.

* * * * *